(12) United States Patent
Nakane et al.

(10) Patent No.: US 7,104,923 B2
(45) Date of Patent: Sep. 12, 2006

(54) START CONTROL APPARATUS AND PROGRAM FOR A START CONTROL METHOD

(75) Inventors: Mitsunori Nakane, Anjo (JP); Masayuki Tsugawa, Anjo (JP); Masayuki Sugiura, Anjo (JP); Muneo Kusafuka, Anjo (JP); Kenji Suzuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 187 days.

(21) Appl. No.: 10/980,827

(22) Filed: Nov. 4, 2004

(65) Prior Publication Data
US 2005/0121279 A1 Jun. 9, 2005

(30) Foreign Application Priority Data
Nov. 6, 2003 (JP) .............................. 2003-376615

(51) Int. Cl.
*F16H 59/74* (2006.01)
(52) U.S. Cl. ....................................................... 477/99
(58) Field of Classification Search .................. 477/99; 290/38 R; 710/62
See application file for complete search history.

(56) References Cited
U.S. PATENT DOCUMENTS
6,205,390 B1    3/2001   Holbrook et al. ............. 701/62

6,597,071 B1    7/2003   Hiyama et al. ........... 290/38 R
2004/0079181 A1  4/2004   von Haeften

FOREIGN PATENT DOCUMENTS

| DE | 197 32 924 | 2/1998 |
|----|------------|--------|
| DE | 102 32 165 | 2/2004 |
| JP | 2000-136874 | 5/2000 |
| JP | 2001-174212 | 6/2001 |
| JP | 2002-174162 | 6/2002 |

*Primary Examiner*—Dirk Wright
(74) *Attorney, Agent, or Firm*—Bacon & Thomas, PLLC

(57) ABSTRACT

A start control apparatus includes a position sensor, a basic start determination processor, a sensor output determination processor, and a start permission continuation processor. The basic start determination processor determines whether a sensor output is in a permission region for permitting the start of operation of a motor when an engine start range is selected, and generates a start permission signal when the sensor output is in the permission region. The sensor output determination processor determines whether distinctive variation characteristics are detected in the sensor output when the motor is started based on the start permission signal and supply of electrical current to the motor. The start permission continuation processor permits continuation of operation of the motor when the variation characteristics are detected.

9 Claims, 8 Drawing Sheets

START CONTROL APPARATUS AND PROGRAM FOR A START CONTROL METHOD

CROSS-REFERENCE TO RELATED APPLICATIONS

The present application claims, under 35 USC 119, priority of Japanese Application No. 2003-376615 filed Nov. 6, 2003.

INCORPORATION BY REFERENCE

The disclosure of Japanese Patent Application No. 2003-376615 filed on Nov. 6, 2003 including the specification, drawings and abstract is incorporated herein by reference in its entirety.

BACKGROUND OF THE INVENTION

1. Field of the Invention

The present invention relates to a start control apparatus and a program for a start control method.

2. Description of the Related Art

In the related art, for example in a vehicle equipped with a vehicle drive apparatus (power train) such as a stepped automatic transmission, a continuously variable automatic transmission (CVT), a semi-automatic transmission, an electrically driven apparatus using a drive motor as a drive source, and an electrically driven apparatus using a drive motor, an engine and a power generator as drive sources, when a range is selected by positioning of a shift lever (or other shift control member), a vehicle drive control apparatus for controlling the vehicle drive apparatus turns on and off solenoids or the like in accordance with the transmission logic for the selected range. For this purpose, a position determination apparatus is provided. The position determination apparatus receives an output signal from a position sensor. The position determination apparatus determines the shift position, i.e., position of the shift lever, based on the output signal to detect the selected range.

The position sensor may be a non-contact sensor having a magnet and a Hall IC or the like. When the shift lever or the like is repositioned by the driver, a manual shaft and the magnet attached to the manual shaft are rotated together responsive to the movement of the shift lever. The Hall IC generates an analog sensor output corresponding to the rotation of the magnet. For example, see Japanese Patent Application Laid-Open No. 2001-174212.

For example, in a vehicle equipped with a stepped automatic transmission, a start control apparatus is provided. When it is determined that a range suitable for starting the engine, i.e., an engine start range such as the parking range or the neutral range, is selected in order to start the engine, the start control apparatus outputs a start permission signal to a motor drive circuit to permit operation of the starter motor. As a result, the motor drive circuit starts the starter motor by supplying electrical current to the starter motor, and the starter motor, in turn, drives the engine.

However, in the start control apparatus of the related art, when the starter cable, i.e., the power line for supplying electrical current to the starter motor, is run near the position sensor, the magnetic field generated by the electrical current flowing through the starter cable in operation of the starter motor may affect the Hall IC, and cause errors in the sensor output of the Hall IC.

As a result, even if the shift lever is actually in a position selecting an engine start range, it may be erroneously determined that an engine start range has not been selected due to error in the sensor output of the Hall IC, the loss of performance in the Hall IC, or the like. In this case, the start of the starter motor is prohibited unintentionally.

FIG. 2 is a time chart showing operation of the start control apparatus in the related art wherein Vh denotes a voltage value indicating the sensor output of the Hall IC. When the voltage value Vh is in a permission region, i.e., not less than a lower limit value VNL, the start control apparatus permits the start of the starter motor. When the voltage value Vh is less than the lower limit value VNL, i.e., in a prohibition region, the start control apparatus prohibits energizing the starter motor.

That is, when the shift lever is in a position corresponding to an engine start range, e.g., in the neutral position, the voltage value Vh (the sensor voltage expressed in volts [v]) is not less than the lower limit value VNL. Therefore, the start control apparatus permits operation of the starter motor. However, a magnetic field is generated when electrical current flows through a line to the starter motor at time t1, and the magnetic field affects the Hall IC. When the voltage value Vh becomes less than the lower limit value VNL at time t2, the start control apparatus prohibits operation of the starter motor. Thereafter, the voltage value Vh reaches the minimum value at time t3. When the voltage value Vh reaches the lower limit value VNL at time t4, the start control apparatus permits operation of the starter motor.

As described above, when the voltage value Vh becomes less than the lower limit value VNL, even if the shift lever is in a position corresponding to an engine start range, it may be determined that an engine start range is not selected, and operation of the starter motor is prohibited.

SUMMARY OF THE INVENTION

Accordingly, an object of the present invention is to provide a start control apparatus and a program for carrying out a start control method in which operation of a starter motor is not prohibited when a shift control member is actually in a position corresponding to an engine start range.

The start control apparatus of the present invention comprises a position sensor for generating a sensor output when a range is selected by operation of a shift control member; a basic start determination processor for determining whether the sensor output is in a permission region for permitting operation of the starter motor when a range suitable for starting an engine is selected, and generating a start permission signal for permitting operation of the starter motor when the sensor output is in the permission region; a sensor output determination processor for determining whether distinctive variation characteristics are detected in the sensor output when operation of the starter motor is started responsive to the start permission signal, with electrical current supplied to the starter motor; and a start permission continuation processor for continuing permission to operate the starter motor responsive to detection of the variation characteristics.

When a start permission signal is generated, the starter motor is started and, with electrical current supplied to the motor, it is determined whether distinctive variation characteristics are detected in the sensor output. When the distinctive characteristics are detected, permission for operation of the starter motor is continued. Therefore, operation of the motor is not prohibited when the shift lever is actually in a position for selection of an engine start range, and the engine is reliably started.

Further, when a starter cable (power to the starter motor) is run near the position sensor, it is not necessary to provide a shield or the like for protecting the position sensor from the magnetic field generated by current flowing through the starter cable.

DETAILED DESCRIPTION OF THE PREFERRED EMBODIMENT

Figure 1:
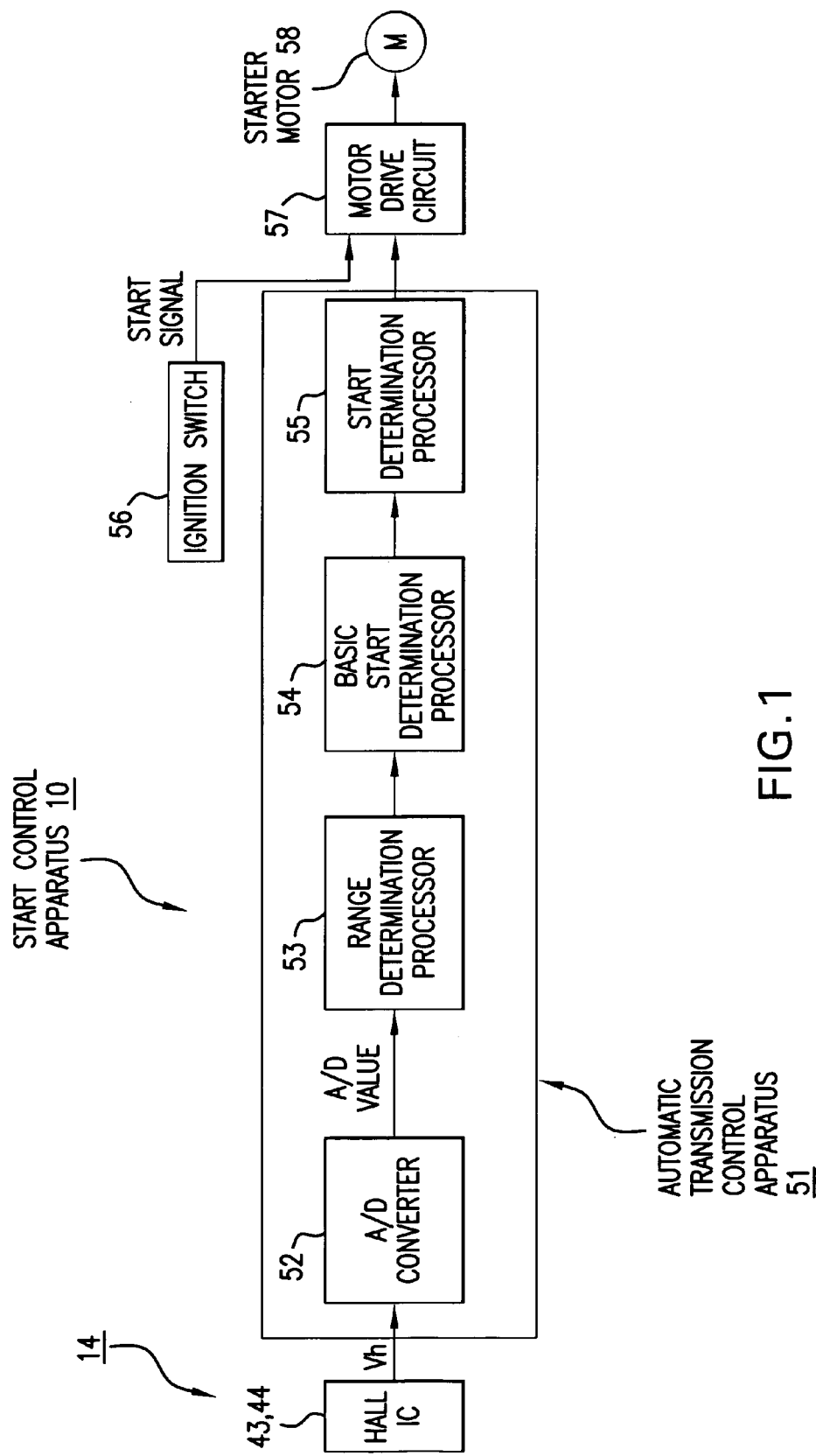
FIG. 1 is a block diagram of a start control apparatus according to an embodiment of the present invention.
Figure 2:
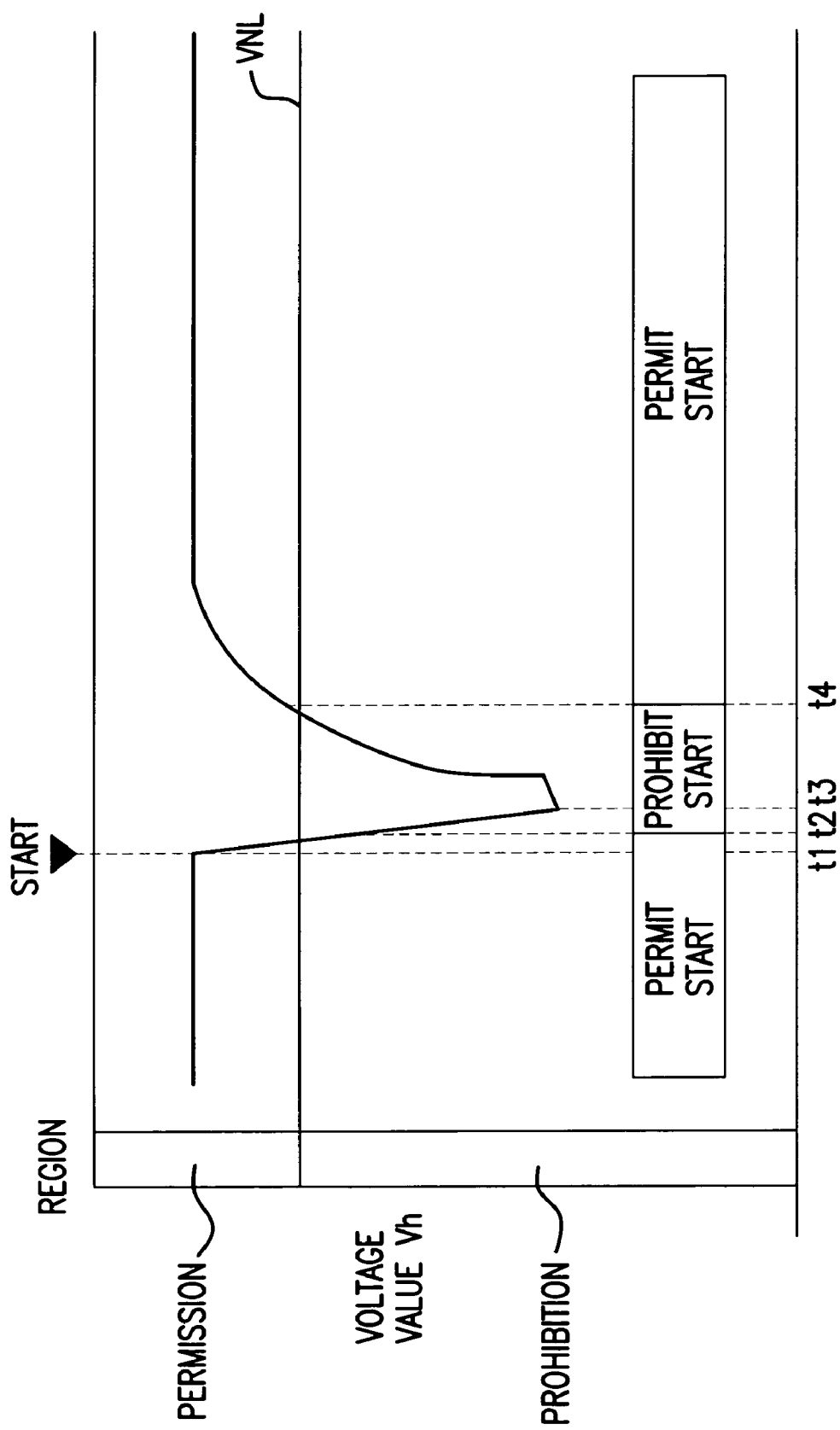
FIG. 2 is a time chart showing operation of a start control apparatus of the related art.

An embodiment of the present invention will now be described in detail with reference to the drawings. While the present invention is applicable to vehicles equipped with various types of transmissions, including stepped automatic transmissions, continuously variable automatic transmissions and semi-automatic transmissions, in the following description it is assumed that the vehicle is equipped with a stepped automatic transmission.

FIGS. 3–6 show a position determination apparatus 11 housed in a case 16 and mounted on a transmission case 12 with a manual shaft 13 (rotation member) rotatably supported by the case 12 through a bearing (not shown). Various components including a position sensor 14, a control module 15, and a connector 17 are housed in the control apparatus case 16. The control module 15 is a vehicle drive control apparatus functioning as an automatic transmission control apparatus. The control module 15 is connected by the connector 17 to a plurality of devices, e.g., transmission solenoids such as linear solenoids, and ON/OFF solenoids for control in various control routines, an engine (drive power source—not shown), indicators, and other vehicle control elements. The automatic transmission control apparatus includes components such as a CPU, a RAM, and a ROM, and functions as a computer for performing operations based on data recorded in the RAM, ROM or the like, to control the automatic transmission. Note that, in the illustrated embodiment, the position sensor 14 is housed in the control apparatus case 16 disposed in the engine compartment. Alternatively, the position sensor 14 may be mounted in a valve body or disposed in another compartment of the vehicle.

The position sensor 14 and the control module 15 are electrically connected to form an integrated sensor control apparatus.

Figure 3:
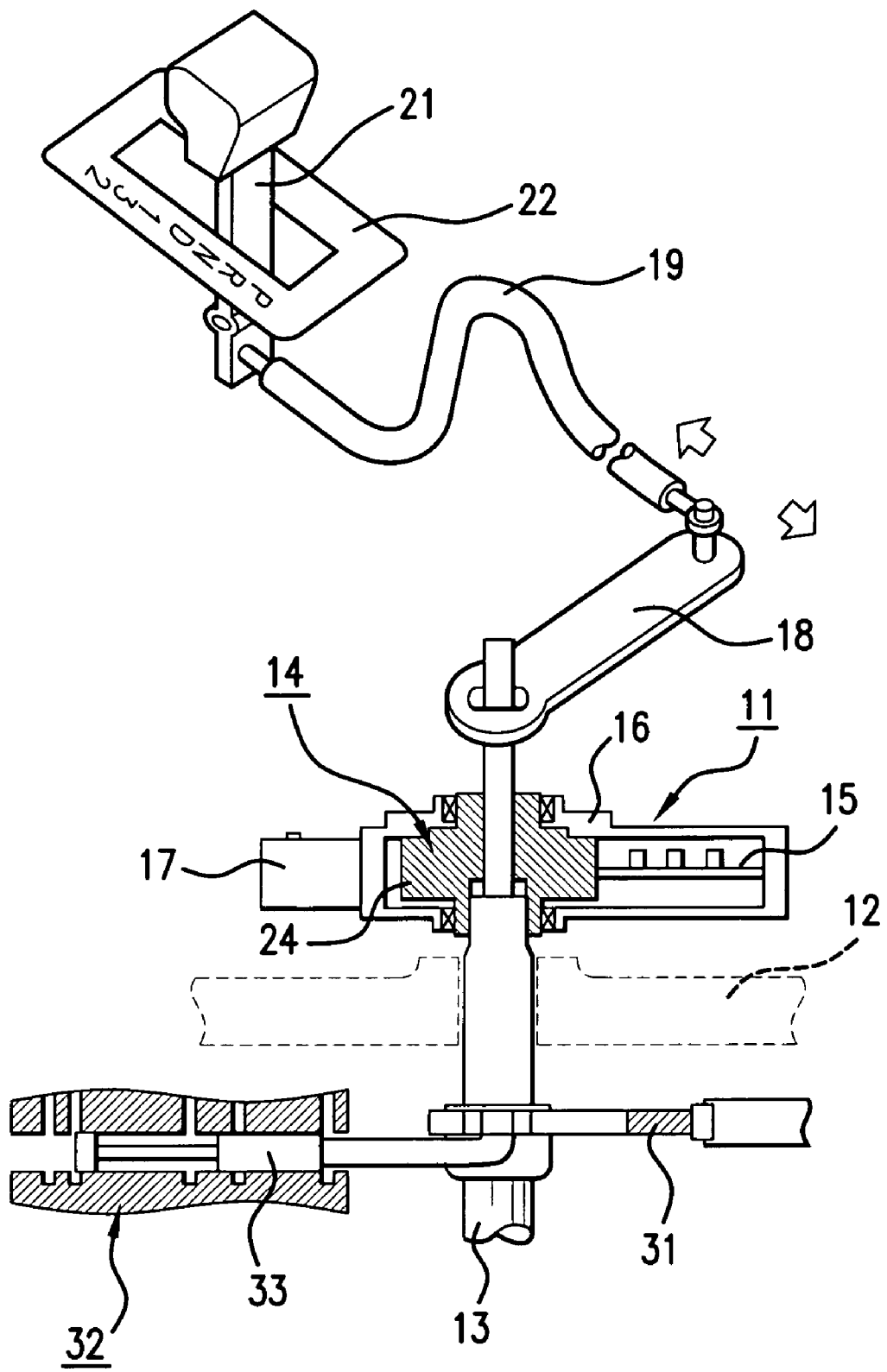
FIG. 3 is a view showing operation of a position determination apparatus according to the embodiment of FIG. 1.

As shown in FIG. 3 the manual shaft 13 is connected to an outer lever 18 outside the case 12. The manual shaft 13 is also coupled to a shift lever 21, serving as a shift control member, through the outer lever 18, and a control wire 19 (connection wire). The manual shaft 13 is also coupled to a detent 31 in the case 12. The detent 31 is coupled to valve spool 33 of manual valve 32. The shift lever 21 is used to select the range of the automatic transmission. For this purpose, the shift lever 21 is moved along a guide 22 to select a parking range (P range), a reverse range (R range), a neutral range (N range), a drive range (D range), a fourth speed range, a third speed range, or a second speed range. The parking range and the neutral range are set as engine start ranges for starting the engine. Further, instead of using the shift lever 21, a shift switch or the like which is depressed to select a shift speed may be used as the shift control member.

Figure 4:
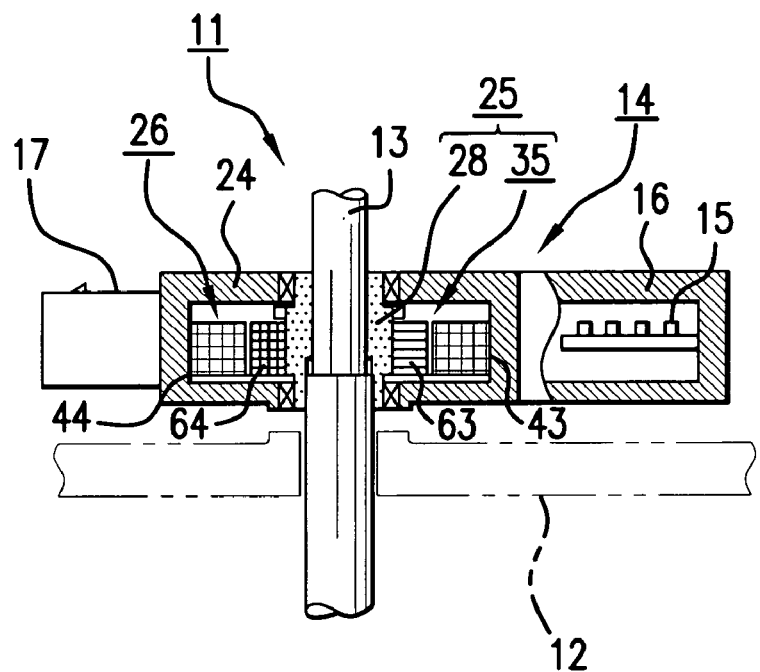
FIG. 4 is a longitudinal sectional view showing main components of the position determination apparatus according to the embodiment of FIG. 1.
Figure 5:
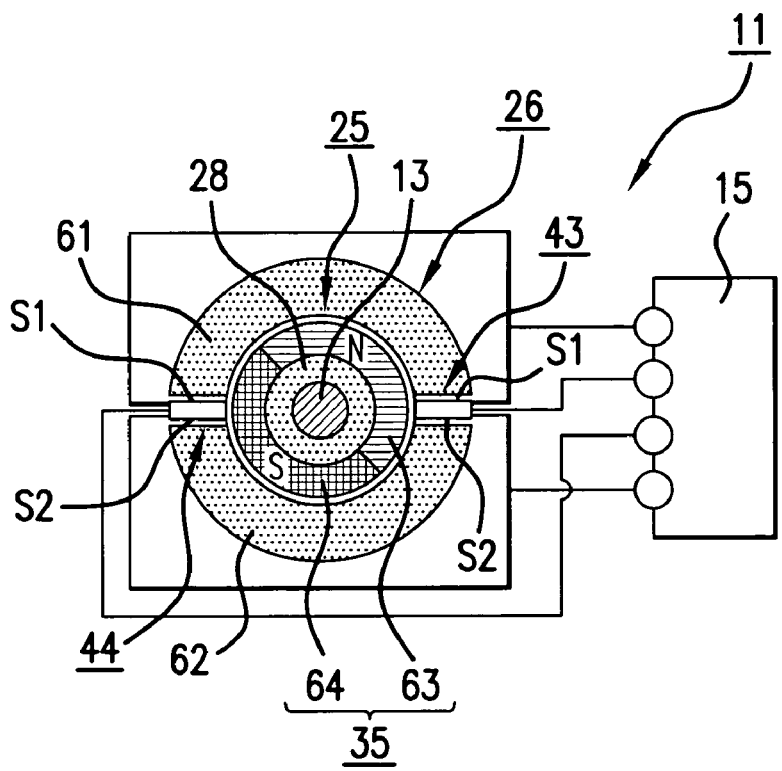
FIG. 5 is a cross sectional view showing main components of the position determination apparatus according to the embodiment of FIG. 1.
Figure 6:
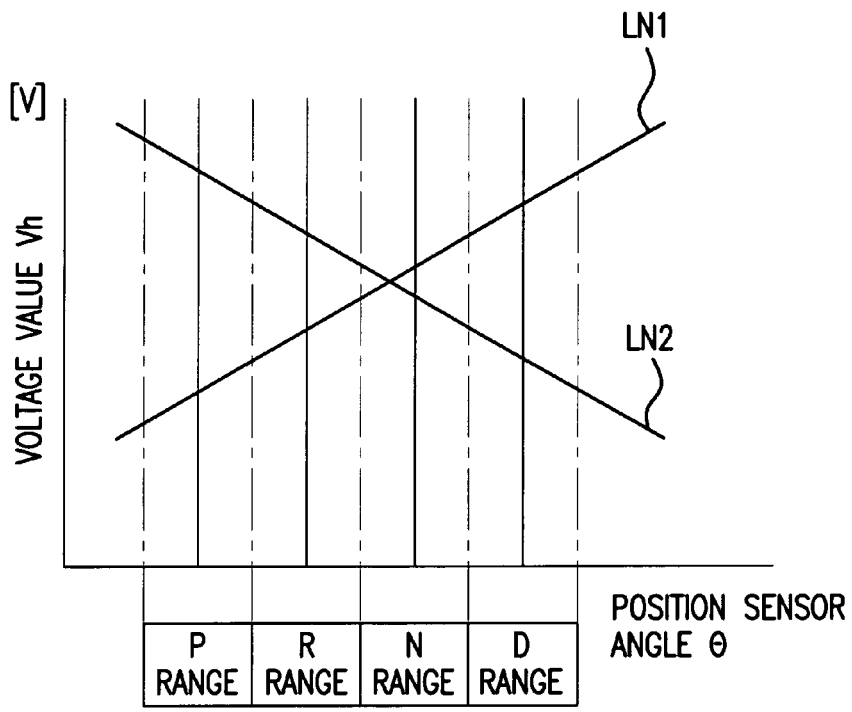
FIG. 6 is a graph showing input/output characteristics of the position sensor, i.e., sensor output voltage Vh versus position sensor angle θ, according to the embodiment of FIG. 1.

As shown in FIGS. 4 and 5, the position sensor 14 includes a rotary unit 25 and a stationary unit 26. The rotation unit 25 as a unit to be detected is attached to the manual shaft 13 in the control apparatus case 16, and rotated together with the manual shaft 13. The stationary unit 26 is a detector unit which detects the angular position of rotary unit 25. The stationary unit 26 is attached to the control apparatus case 16 and is positioned radially outward of and surrounding the rotary unit 25. The rotary unit 25 includes a rotor 28 in the form of a cylinder of a soft magnetic material, and an annular magnet 35 attached to the outer circumferential surface of the rotor 28 at a predetermined position along the axis of the rotor 28. The stationary unit 26 includes a sensor case 24, and Hall ICs 43, 44 as first and second detection elements housed in the sensor case 24. The Hall ICs 43, 44 are 180° spaced from each other. Half-fan shaped cores 61, 62, made of a soft magnetic material, are provided between the Hall ICs 43, 44.

The magnet 35 has an N magnetic pole section 63 as a first magnetic pole section and an S magnetic pole section 64 as a second magnetic pole section. Each of the N magnetic pole section 63 and the S magnetic pole section 64 extends 180° around the circumference of the rotor 28. The N magnetic pole section 63 and the hall IC 43 form a first sensor unit, and the S magnetic pole section 64 and the Hall IC 44 form a second sensor unit.

The magnetic flux generated by the magnet 35 flows in the cores 61, 62 and through the Hall ICs 43, 44 from the N magnetic pole section 63 to the S magnetic pole section 64. The Hall ICs 43, 44 have a electromagnetic conversion function for converting the magnetic flux density into a voltage value Vh, and for outputting the voltage value Vh. In the Hall ICs 43, 44, the magnetic flux flows into and out of the surface substantially perpendicular to the flow of the magnetic flux. In the illustrated embodiment, the magnetic flux flows into and out of two surfaces S1, S2 facing the cores 61, 62. The magnetic flux does not flow into and out of the other two surfaces which do not face the cores 61, 62.

The position sensor 14 detects the rotational angle of the rotary unit 25 indicating the extent of movement of the shift lever 21, i.e., the position sensor angle θ (rotational angle expressed in degrees), without contact, and generates one continuous analog signal, changing in correspondence with the extent of movement of the shift lever 21, i.e., a shift position detection signal as a sensor output, or the voltage value Vh in the illustrated embodiment.

In this case, the position sensor 14 has linear input/output characteristics. The position sensor 14 generates the voltage value Vh linearly and continuously changing in correspondence with the change in the position sensor angle θ, based on the operation of the shift lever 21 by the driver. As shown by a line LN1 in FIG. 6, the first sensor unit has first input/output characteristics in which the voltage value Vh continuously increases as the position sensor angle θ increases and the voltage value Vh continuously decreases as the position sensor angle θ decreases. As shown by a line LN2 in FIG. 6, the second sensor unit has second input/output characteristics in which the voltage value Vh continuously decreases as the position sensor angle θ increases, and the voltage value Vh continuously increases the position sensor angle θ decreases. Based on the first and second input/output characteristics, it is possible to detect a failure in the Hall ICs 43, 44.

With an automatic transmission equipped with the position determination apparatus 11, by operating the shift lever 21, as described above, one of the parking range, the reverse range, the neutral range, the drive range, the fourth speed range, the third speed range, and the second speed range is selected. The position sensor angles θ of the position sensor 14 and the voltage values Vh corresponding to the respective ranges are set in advance. Based on the previously set (predetermined) voltage values Vh, the shift position indicating the position of the shift lever 21 is determined, and a threshold value (determination reference value) used as a reference for determining the range is expressed.

When the shift lever 21 is manually moved along the guide 22, the manual shaft 13 is rotated through the control wire 19 and the outer lever 18. The rotation of the manual shaft 13 causes the detent 31 to rotate together with the manual shaft 13. Further, the valve spool 33 coupled to the detent 31 is moved linearly in correspondence with the rotation of the manual shaft 13 to switch between range pressures such as second range pressure, third range pressure, fourth range pressure, D range pressure, and R range pressure.

When the shift lever 21 is moved along the guide 22 and is selectively positioned in one of the positions P, R, N, D, 4, 3, 2, indicating the respective ranges, the valve spool 33 moves to a valve position previously set in correspondence with the selected position. Thus, the manual valve 32 is set at a hydraulic pressure generation position which has been previously set for the selected shift lever position, a hydraulic pressure corresponding to the position of the manual valve is generated, and the automatic transmission is set in the range in correspondence with the generated hydraulic pressure. After the range is set, further rotation of the manual shaft 13 is prevented by the detent 31, and the shift lever 21 is held in the selected shift position.

Next, the start control apparatus for control of the starter motor (not shown) will be described.

FIG. 1 shows the start control apparatus 10 as including a position sensor 14 and Hall ICs 43 and 44, an automatic transmission control apparatus 51, an A/D converter 52, a range determination processing unit 53 (range determination processor), a basic start determination processing unit 54 (a basic start determination processor), a start determination processing unit 55 (start determination processor), an ignition key switch 56, a motor drive circuit 57, and a starter motor (M) 58.

In the start control apparatus 10, when a key is used to turn on the ignition switch 56, a start signal generated by the ignition switch 56 is sent to the motor drive circuit 57.

A start processor (not shown) of the automatic transmission control apparatus 51 performs a start process by reading the voltage value Vh from the Hall ICs 43, 44. Based on the voltage value Vh, the start processor determines whether an engine start range has been selected. If an engine start range has been selected, the start processor generates a start permission signal, and sends the start permission signal to the motor drive circuit 57.

When the motor drive circuit 57 receives the start signal from the ignition switch 56, the motor drive circuit 57 determines whether a start permission signal is sent from the start determination processing unit 55. If a start permission signal is sent from the start determination processing unit 55, the motor drive circuit 57 supplies electrical current to the starter motor 58 to operate the starter motor 58. If the start permission signal is not sent from the start determination processing unit 55, the motor drive circuit 57 does not supply electrical current to the starter motor 58, and the starter motor 58 will not operate.

Thus, the engine is started when an engine start range is selected. When an engine start range is not selected, the engine can not be started even if the ignition switch 56 is turned on.

Next, operation of the start processor will be described.

In the illustrated embodiment, the start process is executed based on the sensor output from the Hall IC 43. Alternatively, the start process may be executed based on the sensor output from the Hall IC 44 or based on the sensor outputs from both of the Hall ICs 43, 44.

When the position sensor 14 is rotated by rotation of the manual shaft 13 (see FIG. 3), the Hall IC 43 generates the voltage value Vh in correspondence with the position sensor angle θ, and outputs the voltage value Vh to the automatic transmission control apparatus 51. When the start processor receives the voltage value Vh, the voltage value Vh is A/D converted by the AND converter 52 into an A/D value. Subsequently, the range determination processing unit 53 of the start processor executes a range determination process to read the voltage value Vh of the A/D value, and compares the voltage value Vh with the respective thresholds to determine the selected range. Based on the results of this determination, the range determination processing unit 53 outputs control signals to the respective related devices outside the control apparatus case 16 through corresponding terminals of the connector 17 for controlling the related devices.

Thus, based on instructions from the automatic transmission control apparatus 51, various controls such as an automatic transmission control, engine control and an indicator control can be executed.

Thereafter, the basic start determination processing unit 54 of the start processor executes a basic start determination routine to read the voltage value Vh, and determines whether the voltage value Vh has been set in correspondence with an engine start range, and whether the voltage value Vh is in the permission region where operation of the starter motor 58 is permitted.

Figure 9:
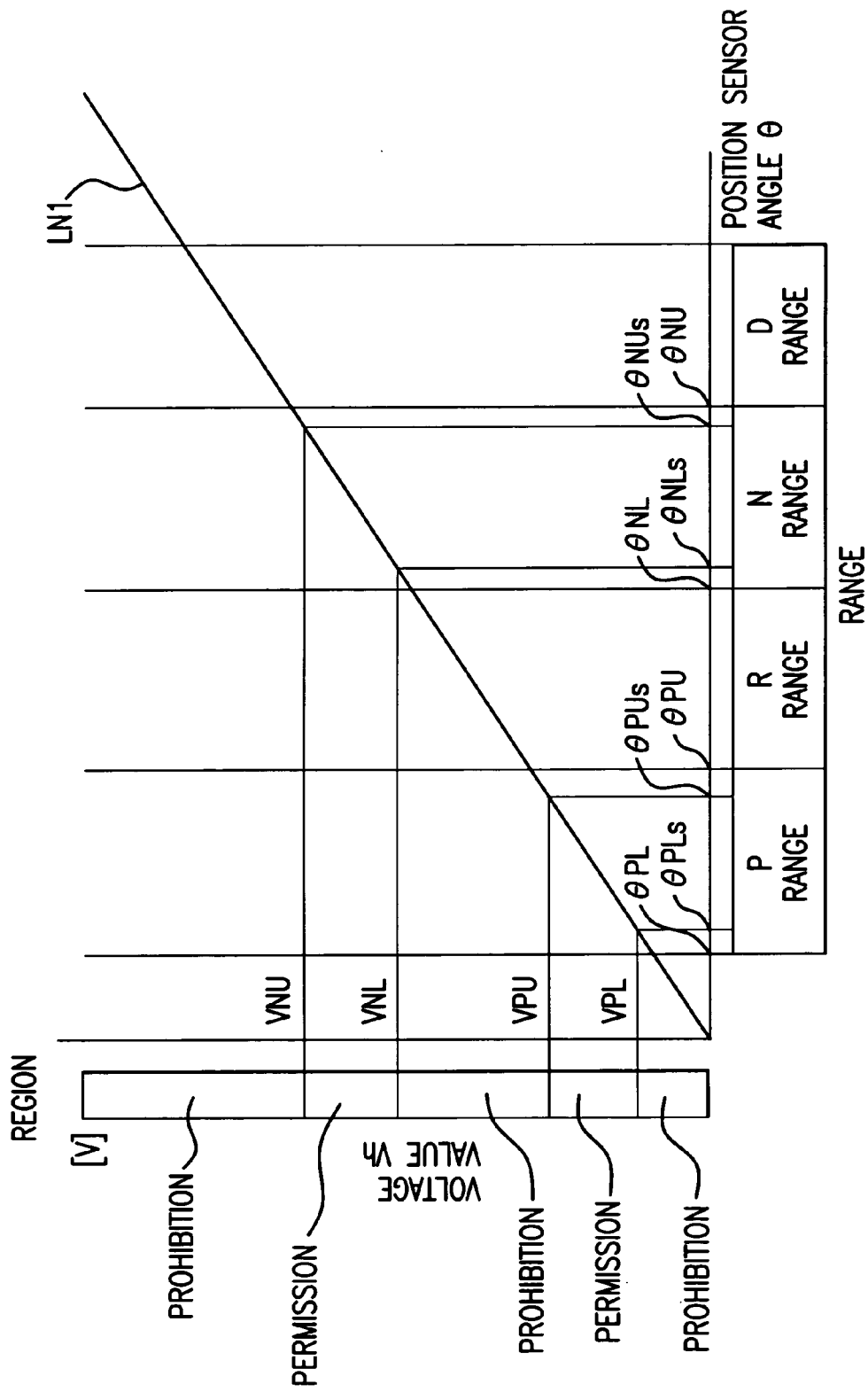
FIG. 9 is a graph of sensor output voltage Vh versus position sensor angle θ, showing a relationship between the input/output characteristics of a position sensor and permission regions and prohibition regions according to the embodiment of FIG. 1.

As shown in FIG. 9, the range of the position sensor angle θ assigned to the parking range is represented by the following expression.

$$\theta PL \leq \theta \leq \theta PU$$

However, the permission region in the parking range is narrower than the above range, and is represented by the following expression.

$$\theta PLs \leq \theta \leq \theta PUs$$

Further, the voltage value Vh corresponding to the permission region is determined based on the characteristics expressed by the line LN1, and represented by the following expression.

$$VPL \leq Vh \leq VPU$$

In the latter expression, VPL indicates a lower limit value as a first region border value and VPU indicates an upper limit value as a second region border value.

The range of the position sensor angle θ assigned to the neutral range is represented by the following expression.

$$\theta ONL \leq \theta \leq \theta NU$$

However, the permission region in the neutral range is narrower than the above range, and is represented by the following expression.

$$\theta NLs \leq \theta \leq \theta NUs$$

Further, the voltage value Vh corresponding to the permission region is determined based on the characteristics expressed by the line LN1, and represented by the following expression.

$$VNL \leq Vh \leq VNU$$

In the latter expression above, VNL indicates a lower limit value as a first region border value of the voltage value Vh and VNU indicates an upper limit value as a second region border value of the voltage value Vh.

If the voltage value Vh is in the permission region of the engine start range, the basic start determination processing unit 54 permits operation of the starter motor 58, and generates a start permission signal. If the voltage value Vh is not in the permission region of the engine start range, the voltage value Vh is in a prohibition region in which operation of the starter motor 58 is prohibited, and the basic start determination processing unit 54 prohibits the start of the starter motor 58.

When the starter cable which supplies electrical current to the starter motor 58 is provided near the position sensor 14, a magnetic field is generated by the electrical current flowing through the starter cable upon operation of the starter motor 58. The magnetic field affects the Hall ICs 43, 44 to cause errors in the sensor outputs of the Hall ICs 43, 44 or to adversely affect the performance of the Hall ICs 43, 44. As a result, even if the shift lever 21 is actually in a position for selecting an engine start range, when the voltage value Vh is outside of the permission region due to the errors in the sensor output of the Hall ICs 43, 44 or due to the impaired performance of the Hall ICs 43, 44, operation of the starter motor 58 is prohibited.

In particular, since the automatic transmission is mounted adjacent the engine, the position determination apparatus 11 associated with the automatic transmission and the starter motor 58 for starting the engine are in close proximity to each other. As a result, it is highly likely that the magnetic field generated by the cable supplying electrical current to the starter motor 58 will adversely affect the Hall ICs 43, 44.

As described above, when the basic start determination processing unit 54 determines that the voltage value Vh is in the permission region of the engine start range, a start permission signal is generated, and the motor drive circuit 57 supplies electrical current to the starter motor 58, and the starter motor 58 is temporarily started. However, if the magnetic field generated by the starter cable adversely affects the Hall IC 43, since operation of the starter motor 58 is prohibited with the engine not started, the driver may feel a sense of frustration.

Therefore, in the basic start determination process, if it is determined that the voltage value Vh is in the permission region of the engine start range, and operation of the starter motor 58 is permitted, the start determination processing unit 55 executes a start determination routine to detect whether distinctive variation characteristics are present in the voltage value Vh. The distinctive variation characteristics appear when rush current is generated immediately after the start of operation of the starter motor 58. Based on the result of that determination, the start determination processing unit 55 continues to permit the engine starting operation or prohibits the starting operation.

Figure 10:
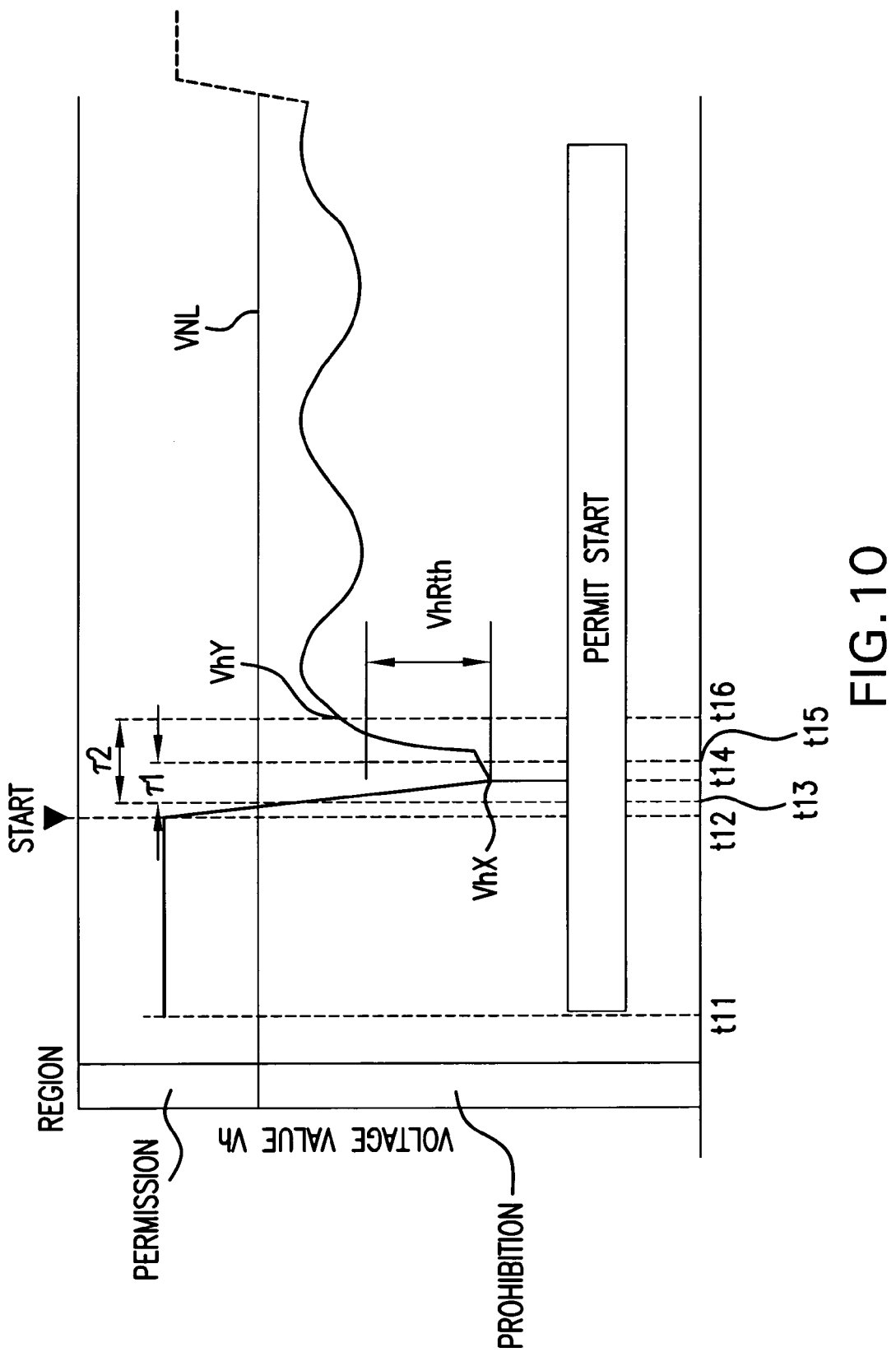
FIG. 10 is a time chart of operations of the start control apparatus according to the embodiment of FIG. 1.

That is, when operation of the starter motor 58 is permitted, the start determination processing unit 55 reads the voltage value Vh at time t11 in FIG. 10, and determines whether the voltage value Vh is in the permission region of the engine start range. If the voltage value Vh is in the engine start range, e.g., in the permission region of the neutral range, a start permission continuation processor (not shown) of the start determination processing unit 55 allows continuation of the starting operation.

Then, when the starter motor 58 is started at time t12, as the electrical current supplied to the starter motor 58 flows through the starter cable, the Hall IC 43 is affected by the magnetic field, and the voltage value Vh starts to decrease. Then, when the voltage value Vh become less than the lower limit VNL at time t13, and the voltage Vh has fallen out of the permission region of the neutral range, a deviation value calculation processor (not shown) of the start determination processing unit 55 executes a deviation value calculation routine to start timing using a timer (not shown) included in the automatic transmission control apparatus 51, calculates the minimum value (or the maximum value) of the voltage value Vh, and records the calculated value in the RAM. Meanwhile, permission for operation of the starter motor 58 is continued.

After a predetermined time τ1 has passed at time t15 since the start of timing by the timer, the minimum value (or the maximum value) which is furthest deviated from the lower limit value VNL (or the upper limit value VNU) between time t13 to time t15 is taken as the largest deviation VhX, and is recorded in the RAM. In this embodiment, the voltage value Vh at time t14 is recorded as the largest deviation VhX.

In FIG. 10, since the voltage value Vh decreases as the electrical current supplied to the starter motor 58 flows through the starter cable, the minimum value is calculated as the maximum deviation VhX. However, depending on the direction of the starter cable, the voltage value Vh increases as the electrical current supplied to the starter motor 58 flows through the starter cable. In this case, therefore, the maximum value is calculated as the maximum deviation VhX.

The voltage value Vh changes in its distinctive characteristics due to the generation of rush current immediately after starting operation of the starter motor 58, at which time the voltage value Vh sharply deviates from the lower limit value VNL (or the upper limit value VNU) of the permission region to a minimum value (or maximum value). Then, the value returns to behave like a quadratic function.

In this embodiment, whether it is possible to detect the distinctive variation characteristics in the voltage value Vh depends on the condition where the voltage value Vh falls out of the permission region and returns.

Thus, after the start of timing by the timer, when the time τ2 set in advance has passed at time t16, a return amount determination processor, serving as a sensor output determination processor (not shown) of the start determination processing unit 55, executes a return amount determination routine (sensor output determination routine) to calculate the return amount VhR expressed as the absolute value of the difference between the current value VhY indicating the current voltage value Vh at the time t16 and the maximum deviation value VhX as represented by the following expression.

$$VhR = |VhY - VhX|$$

Then, the return amount determination processor reads the lower limit value VNL (or the upper limit value VNU) and the maximum deviation amount VhX to calculate a required return amount VhRth, indicating the returning condition required for detecting the variation characteristics in accordance with a predetermined return ratio γ by the following expression.

$$VhRth = |VNL - VhX| \times \gamma$$

The return amount determination processor determines whether the return amount VhR is not less than the required return amount VhRth indicating the threshold. If the return amount VhR is not less than the required return amount VhRth indicating the threshold, the return amount determination processor detects the distinctive variation characteristics in the voltage value Vh, and the start permission continuation processor continues to permit the starting operation. If the return amount VhR is less than the required return amount VhRth, the return amount determination processor does not detect the distinctive variation characteristics in the voltage value Vh, and a start prohibition processor (not shown) of the start determination processing unit 55 executes a start prohibition routine to prohibit the starting operation.

As described above, if the return amount VhR is not less than the required return amount VhRth, the variation of the voltage value Vh indicates variation characteristics due to occurrence of a rush current immediately after the start of operation of the starter motor 58. Since the permission for operation of the starter motor 58 is continued, when the shift lever 21 is actually in a position for selecting an engine start range, operation of the starter motor 58 is not prohibited, and thus, the engine is reliably started. Therefore, the driver does not feel a sense of frustration.

Further, when the starter cable is routed near the Hall ICs 43, 44, it is not necessary to provide a shield or the like for protection from the magnetic field.

Figure 7:
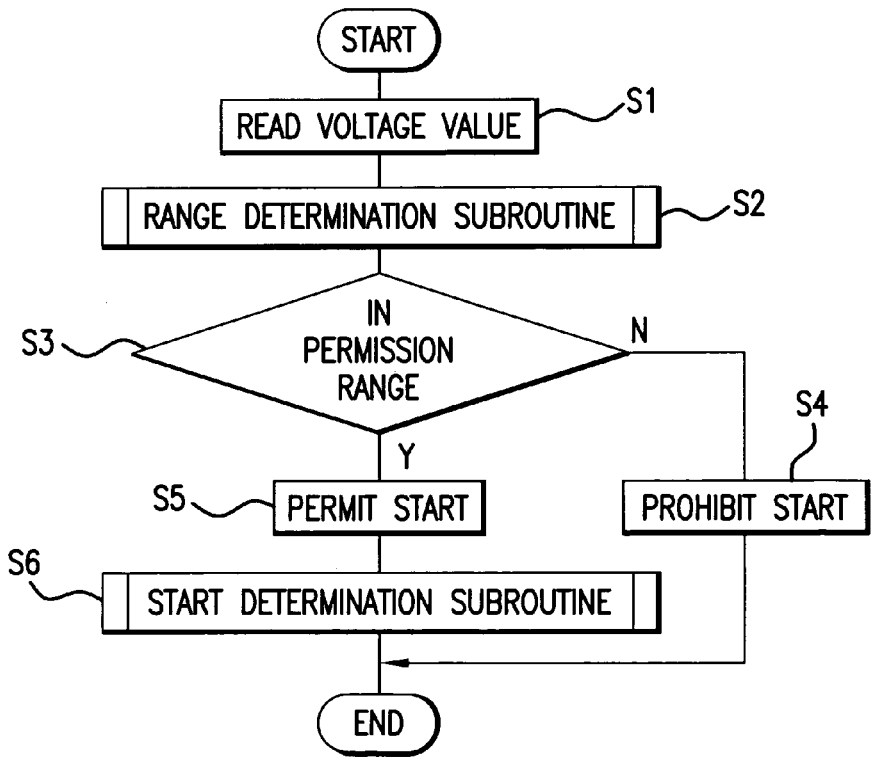
FIG. 7 is a flowchart of the main routine of operation of a start processor according to the embodiment of FIG. 1.

Next, the flowchart for the main routine shown in FIG. 7, as encoded on a computer readable medium, will be described. In step S1, the voltage value Vh is read. In step S2, the range determination subroutine is executed. In step S3, it is determined whether the voltage value Vh is in the permission region for the determined engine starting range. If it is determined that the voltage value Vh is in the permission region, the routine proceeds to step S5. If it is determined that the voltage value Vh is not in the permission region, the routine proceeds to step S4. In step S4, the starting operation is prohibited, and the routine is ended. In step S5, the starting operation is permitted. In step S6, the start determination subroutine is executed and the main routine is finished.

Figure 8:
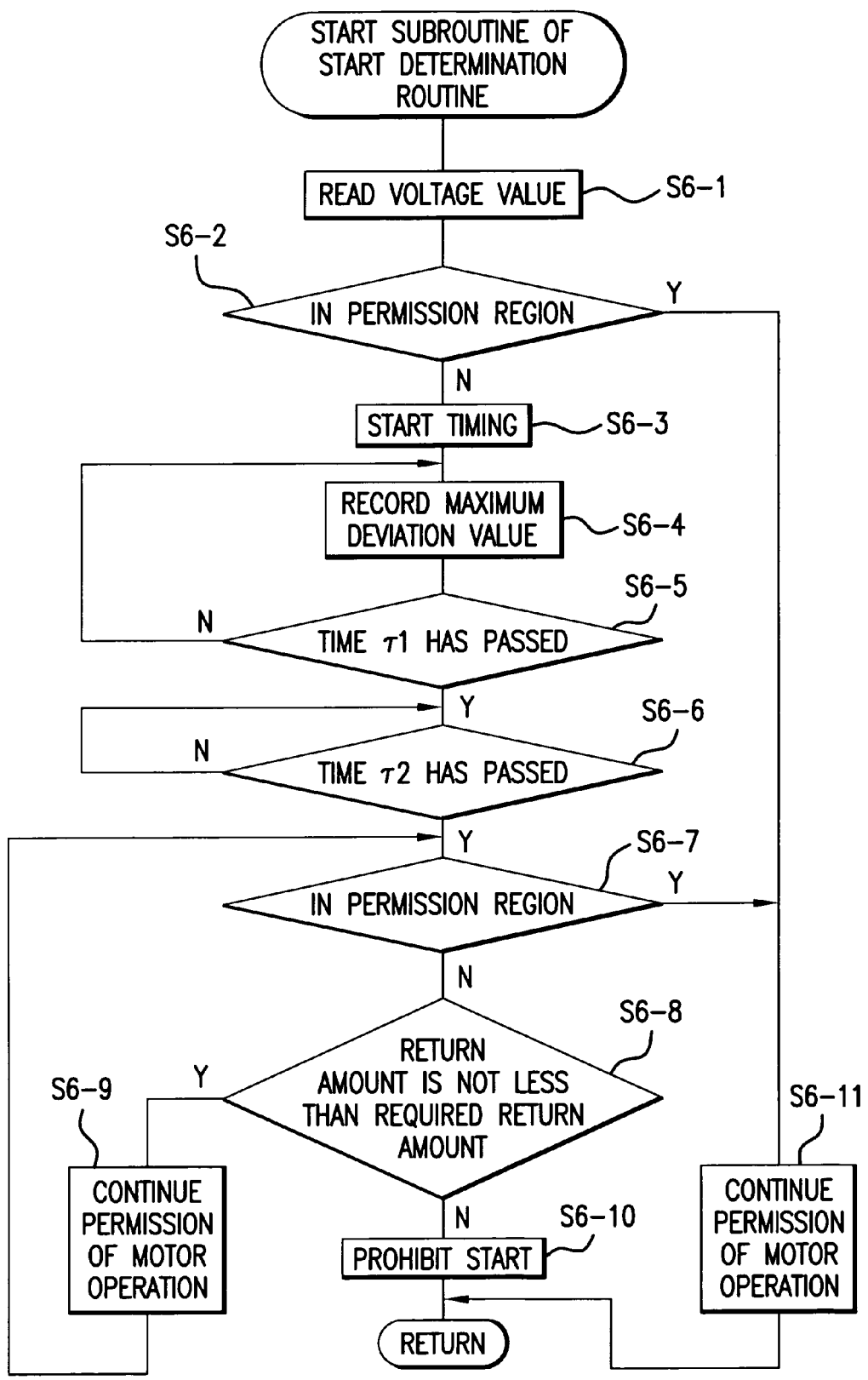
FIG. 8 is a flowchart of a subroutine for start determination with the embodiment of FIG. 1.

Next, the flowchart of FIG. 8 for the start determination subroutine (step S6 in FIG. 7) will be described. In step S6-1, the voltage value Vh is read. In step S6-2, it is determined whether the voltage value Vh is in the permission region. If it is determined that the voltage value Vh is in the permission region, the routine proceeds to step S6-11. If it is determined that the voltage value Vh is not in the permission region, the routine proceeds to step S6-3. In step S6-3, timing by the timer is started. In step S6-4, the maximum deviation value VhX is recorded. In step S6-5, it is determined whether the time τ1 has passed. If it is determined that the time τ1 has passed, the routine proceeds to step S6-6. If it is determined that the time τ1 has not passed, the routine goes back to step S6-4. In step S6-6, passage of the time τ2 is awaited. When the time τ2 has passed, the routine proceeds to step S6-7. In step S6-7, it is determined whether the voltage value Vh is in the permission region. If the voltage value Vh is in the permission region, the routine proceeds to step S6-11. If the voltage value Vh is not in the permission region, the routine proceeds to step S6-8. In step 6-8, it is determined whether the return amount VhR is not less than the required return amount VhRth. If the return amount VhR is not less than the required return amount VhRth, the routine proceeds to step S6-9. If the return amount VhR is less than the required return amount VhRth, the routine proceeds to step S6-10. In step S6-9, the permission for the starting operation is continued, and the routine returns. In step S6-10, the starting operation is prohibited, and the routine goes back to step S6-7. In step S6-11, the permission for the starting operation is continued, and the routine returns.

The embodiment described above may be used in conjunction with a stepped automatic transmission, a continuously variable automatic transmission, a semi-automatic transmission, or the like, and in any vehicle in which the engine is started by operation of a starter motor. Moreover, the present invention is applicable to a start control apparatus for a vehicle equipped with an electric motor as a drive source, a drive powertrain using an electric motor, an engine and a power generator as drive sources, or the like, in which the engine is started by operation of the drive motor.

It should be noted that the present invention is not limited to the above-described embodiment. Various modifications of the embodiment are possible within the spirit of the present invention, and such modifications are within the scope of the present invention.

What is claimed is:

1. A start control apparatus for a vehicle having at least an engine as a power source, said apparatus comprising:
   a position sensor for generating a sensor output responsive to selection of a range by operation of a shift control member;
   a basic start determination processor for determining whether the sensor output is in a permission region for permitting operation of a motor when an engine start range suitable for starting the engine is selected, and for generating a start permission signal when the sensor output is in the permission region;
   a sensor output determination processor for determining whether distinctive variation characteristics are detected in the sensor output when operation of the motor is started based on the start permission signal for permitting operation of the motor, and supply of electrical current to the motor; and
   a start permission continuation processor for continuing permission for operation of the motor when the variation characteristics are detected.

2. The start control apparatus according to claim 1, wherein the sensor output determination processor determines whether the variation characteristics are detected when the sensor output falls out of the permission region and returns a return amount to within the permission region.

3. The start control apparatus according to claim 2, wherein the sensor output determination processor calculates a return amount for the sensor output based on (1) a current value indicating the sensor output when a predetermined time has passed since the sensor output fell out of the permission region, and (2) a maximum deviation value indicating the sensor output furthest deviated from a limit of the permission region, and detects the variation characteristics when the return amount is not less than the required return amount.

4. The start control apparatus according to claim 3, wherein the motor is a starter motor for starting the engine.

5. The start control apparatus according to claim 2, wherein the motor is a starter motor for starting the engine.

6. The start control apparatus according to claim 1, wherein the sensor output determination processor calculates a return amount for the sensor output based on (1) a current value indicating the sensor output when a predetermined time has passed since the sensor output fell out of the permission region, and (2) a maximum deviation value indicating the sensor output furthest deviated from a limit of the permission region, and detects the variation characteristics when the return amount is not less than the required return amount.

7. The start control apparatus according to claim 6, wherein the motor is a starter motor for starting the engine.

8. The start control apparatus according to claim 4, wherein the motor is a starter motor for starting the engine.

9. A computer readable medium having encoded thereon a program for carrying out a start control method, the program providing a computer with functions comprising:

a basic start determination processor for determining whether a sensor output generated from a position sensor, responsive to operation of a shift control member to select a range, is in a permission region for permitting the starting of a motor when an engine start range suitable for starting an engine is selected, and for generating a start permission signal when the sensor output is in the permission region;

a sensor output determination processor for determining whether distinctive variation characteristics are detected in the sensor output when the motor is started based on the start permission signal and supply of electrical current to the motor; and a start permission continuation processor for continuing permission for operation of the motor when the variation characteristics are detected.

* * * * *